Figure 1:
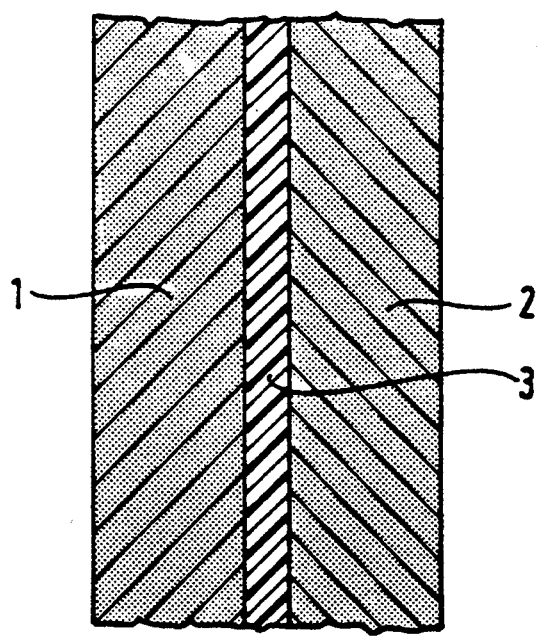

United States Patent [19]
Green et al.

[11] Patent Number: 5,342,708
[45] Date of Patent: Aug. 30, 1994

[54] SEPARATOR FOR AN ALKALINE STORAGE CELL

[75] Inventors: Anthony Green; Patrice Champalle, both of Le Bouscat; Jean-Louis Liska, Bordeaux, all of France

[73] Assignee: Saft, Romainville, France

[21] Appl. No.: 859,718

[22] PCT Filed: Oct. 11, 1991

[86] PCT No.: PCT/FR91/00792
§ 371 Date: Jun. 9, 1992
§ 102(e) Date: Jun. 9, 1992

[87] PCT Pub. No.: WO92/07389
PCT Pub. Date: Apr. 30, 1992

[30] Foreign Application Priority Data

Oct. 12, 1990 [FR] France ................. 90 12621

[51] Int. Cl.$^5$ ............................................. H01M 2/16
[52] U.S. Cl. ...................................... 429/145; 429/206
[58] Field of Search ..................... 429/144, 145, 206

[56] References Cited

U.S. PATENT DOCUMENTS

| | | | |
|---|---|---|---|
| 2,930,829 | 3/1960 | Jacquier | 429/144 |
| 3,484,295 | 12/1969 | Dawson | 429/144 |
| 3,583,029 | 6/1971 | Rabl | |
| 4,137,377 | 1/1979 | McClelland | 429/145 |
| 4,215,186 | 7/1980 | Jaeger | 429/145 X |
| 5,069,990 | 12/1991 | Yoshimura et al. | 429/145 X |

FOREIGN PATENT DOCUMENTS

| | | |
|---|---|---|
| 0176500 | 9/1985 | European Pat. Off. . |
| 2628892 | 9/1989 | France . |
| 1442659 | 10/1973 | United Kingdom . |

OTHER PUBLICATIONS

Patent Abstracts of Japan, vol. 11, No. 117 (E-498) (2564); Apr. 11, 1987 and JPA, 61-264,685 (Matsushita) Nov. 22, 1986.

*Primary Examiner*—Stephen Kalafut
*Attorney, Agent, or Firm*—Sughrue, Mion, Zinn, Macpeak & Seas

[57] ABSTRACT

A separator for an alkaline storage cell comprises: two sheets of felt (10, 20) made of polypropylene, polyamide, or polyethylene, and having a thickness lying in the range 0.1 mm to 0.4 mm; and an intermediate sheet (4) that is plane, microporous, and made of a sintered material selected from polyvinyl chloride and polyethylene. The thickness of said microporous sheet lies in the range 0.1 mm to 0.4 mm; the diameter of its pores lies in the range 10 $\mu$m to 100 $\mu$m, and its weight lies in the range 100 g/cm$^2$ to 400 g/cm$^2$.

7 Claims, 1 Drawing Sheet

SEPARATOR FOR AN ALKALINE STORAGE CELL

The present invention relates to a separator for an alkaline storage cell, in particular a nickel-cadmium storage cell in which the electrodes may have a sintered structure, a foam type or a fiber-based structure, or a structure in which the active material is consolidated by a polymer.

At present, five types of separator are used in such storage cells.

The first type comprises a corrugated or ribbed microporous sheet. This bulky separator requires a certain distance between electrodes and thus limits cell capacity per unit volume. It is also observed that when the electrolyte level falls, the operation of the cell is affected.

The second type comprises firstly a ribbed microporous sheet whose ribbed face is applied against the positive electrode, and secondly a complementary felt adjacent to the plane face. This type suffers from the same drawbacks as a separator of the first type. In addition, it is the seat of pockets of gas accumulation between the electrodes which is detrimental to operation thereof.

The third type is constituted by a set of equidistant cylindrical or prismatic bars made of polyolefin and having a thickness that determines the spacing between the electrodes. This spacing is generally in the range 0.8 mm to 1.2 mm. Such a separator still has the drawbacks of a separator of the first type, but in addition it does not constitute an effective inter-electrode barrier against short circuits if the inter-electrode distance is less than 1 mm.

The fourth type as described in French patent number FR-A-2 628 892, which comprises:

two sheets of polyamide, polypropylene or polyethylene felt having a thickness lying in the range 0.1 mm to 0.4 mm, and having a weight lying in the range 10 g/m$^2$ 100 g/m$^2$; and a membrane of cellophane or polyolefin interposed between these two felts, and having a thickness lying in the range 0.02 mm to 0.03 mm.

The object of the membrane is to act as a barrier to oxygen diffusion, but not to short circuits.

The fifth type of separator is constituted by a corrugated and perforated sheet of PVC. It suffers from the same drawbacks as the first type of separator and in addition it does not provide the electrodes with sufficient protection against short circuits.

An object of the present invention is to implement a separator enabling the inter-electrode distance to be reduced, i.e. enabling cell capacity per unit volume to be increased, while nevertheless forming an effective barrier against short circuits and preventing the formation of pockets of gas.

The present invention provides a separator for an alkaline storage cell, in particular for a nickel-cadmium storage cell, the separator being constituted by two sheets of polypropylene, polyamide, or polyethylene felt having a thickness lying in the range 1.0 mm and 0.4 mm, and having a weight lying in the range 10 g/m$^2$ to 100 g/m$^2$, together with an intermediate sheet interposed between said two felts, the separator being characterized by the fact that said intermediate sheet is plane, has a thickness lying in the range 0.1 mm to 0.4 mm, is made of a sintered material selected from polyvinyl chloride, polyethylene and a copolymer based on polyvinyl chloride or on polyethylene, has a porosity of not less than 30%, has pores of a diameter lying in the range 10 $\mu$m to 100 $\mu$m, and has a weight lying in the range 100 g/m$^2$ to 400 g/m$^2$.

Preferably, said weight is about 220 g/m$^2$ and said pore diameter lies in the range 20 $\mu$m to 30 $\mu$m.

The separator may be assembled around electrodes in the form of bonded pockets; it may also be in the form of continuous strip disposed concertina-like between the electrodes.

Other characteristics and advantages of the present invention appear from the following description of embodiments given by way of non-limiting illustrative example.

Figure 2:
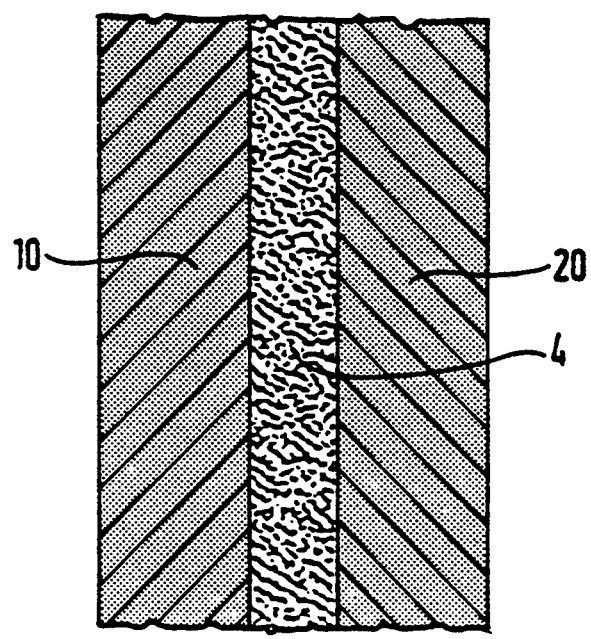

In the accompanying drawing:

FIG. 1 is a highly diagrammatic fragmentary section through a prior art separator corresponding to the fourth above-mentioned type; and FIG. 2 is a highly diagrammatic fragmentary section through a separator of the invention.

The separator of FIG. 1 comprises two sheets 1 and 2 of polyethylene felt having a thickness of 0.15 mm and a weight of 70 g/m$^2$, together with an interposed sheet of cellophane 3 that is 0.02 mm thick.

The separator of FIG. 2 comprises a polyamide felt 10 having a thickness of 0.15 mm and a polypropylene felt 20 having a thickness of 0.1 mm. A plane intermediate sheet 4 is constituted by a microporous structure having a thickness of 0.2 mm and made by sintering a copolymer based on polyvinyl chloride. The weight of this sheet is 220 g/m$^2$, its porosity is greater than 30%, and its pore diameter is about 20 $\mu$m to 30 $\mu$m.

The polyvinyl chloride may be replaced by polyethylene.

A nickel-cadmium storage cell including prior art separators has a lifetime of 1,000 hours to 2,000 hours when permanently overcharged at 40° C., and with an overcharging current density equal to one-tenth of the capacity of the storage cell. Using a separator of the invention makes it possible to increase the lifetime of the storage cell by a factor of two or more, under the same conditions of overcharging.

Naturally, the invention is not limited to the embodiment described above. Without going beyond the scope of the invention, any means may be replaced by equivalent means.

We claim:

1. A separator for an alkaline storage cell, the separator being constituted by two sheets of polypropylene, polyamide, or polyethylene felt having a thickness lying in the range 0.1 mm to 0.4 mm, and having a weight lying in the range 10 g/m$^2$ to 100 g/m$^2$, together with an intermediate sheet interposed between said two felts, the separator being characterized by the fact that said intermediate sheet is plane, has a thickness lying in the range 0.1 mm to 0.4 mm, is made of a sintered polymeric material selected from the group consisting of polyvinyl chloride, polyethylene and a copolymer based on polyvinyl chloride, has a porosity of not less than 30%, has pores of a diameter lying in the range of 10 $\mu$m to 100 $\mu$m, and has a weight lying in the range 100 g/m$^2$ to 400 g/m$^2$.

2. A separator according to claim 1, characterized by the fact that the pore diameter of said sheet lies in the range 20 $\mu$m to 30 $\mu$m, and the weight of said sheet is about 220 g/m$^2$.

3. A separator according to claim 1, characterized by the fact that it is assembled around the electrodes of the storage cell in the form of bonded pockets.

4. A separator according to claim 1, characterized by the fact that it is in the form of a continuous strip disposed concertina-like between the positive and negative electrodes of the cell.

5. A separator according to claim 1, wherein said intermediate sheet is made of a sintered copolymer based on polyvinyl chloride.

6. A separator according to claim 1, wherein said intermediate sheet is made of a sintered polymeric material comprising polyvinyl chloride.

7. A separator according to claim 1, wherein said intermediate sheet is made of a sintered polymeric material comprising polyethylene.

* * * * *